July 25, 1967   C. H. EGGLETON, JR., ET AL   3,332,525
FRICTION BRAKE AND REVERSING CONTROL FOR ELECTRIC HOISTS
Filed Aug. 25, 1965   3 Sheets-Sheet 3
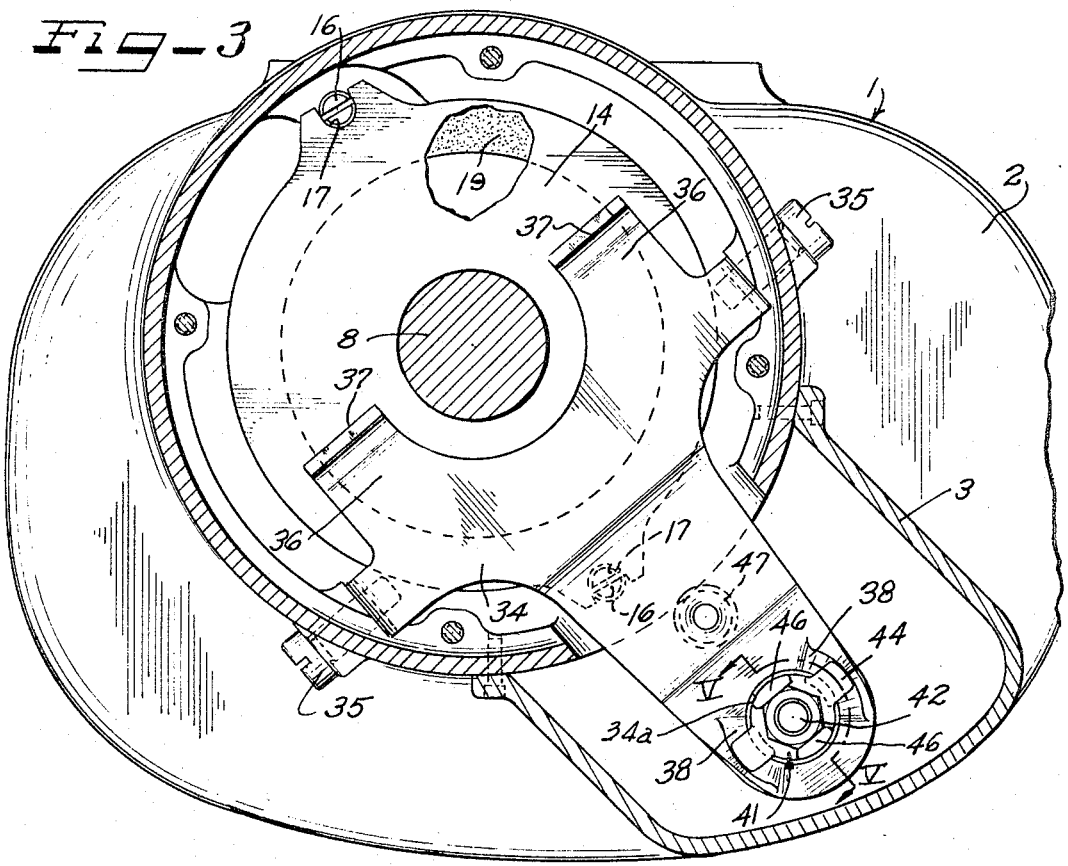
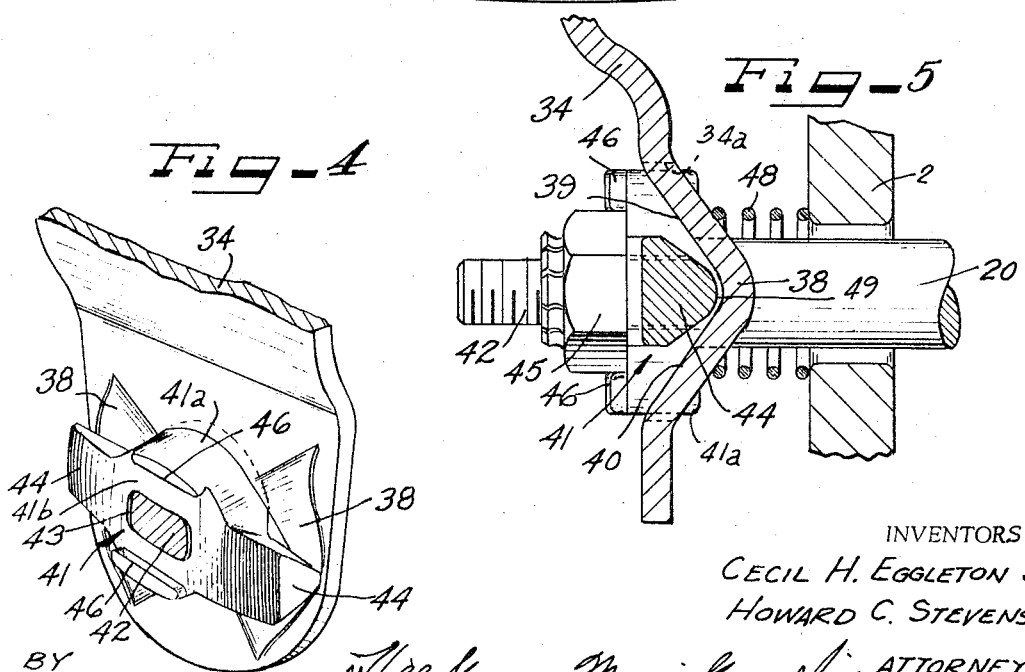
INVENTORS
CECIL H. EGGLETON JR.
HOWARD C. STEVENS JR.
ATTORNEYS United States Patent Office 3,332,525
Patented July 25, 1967

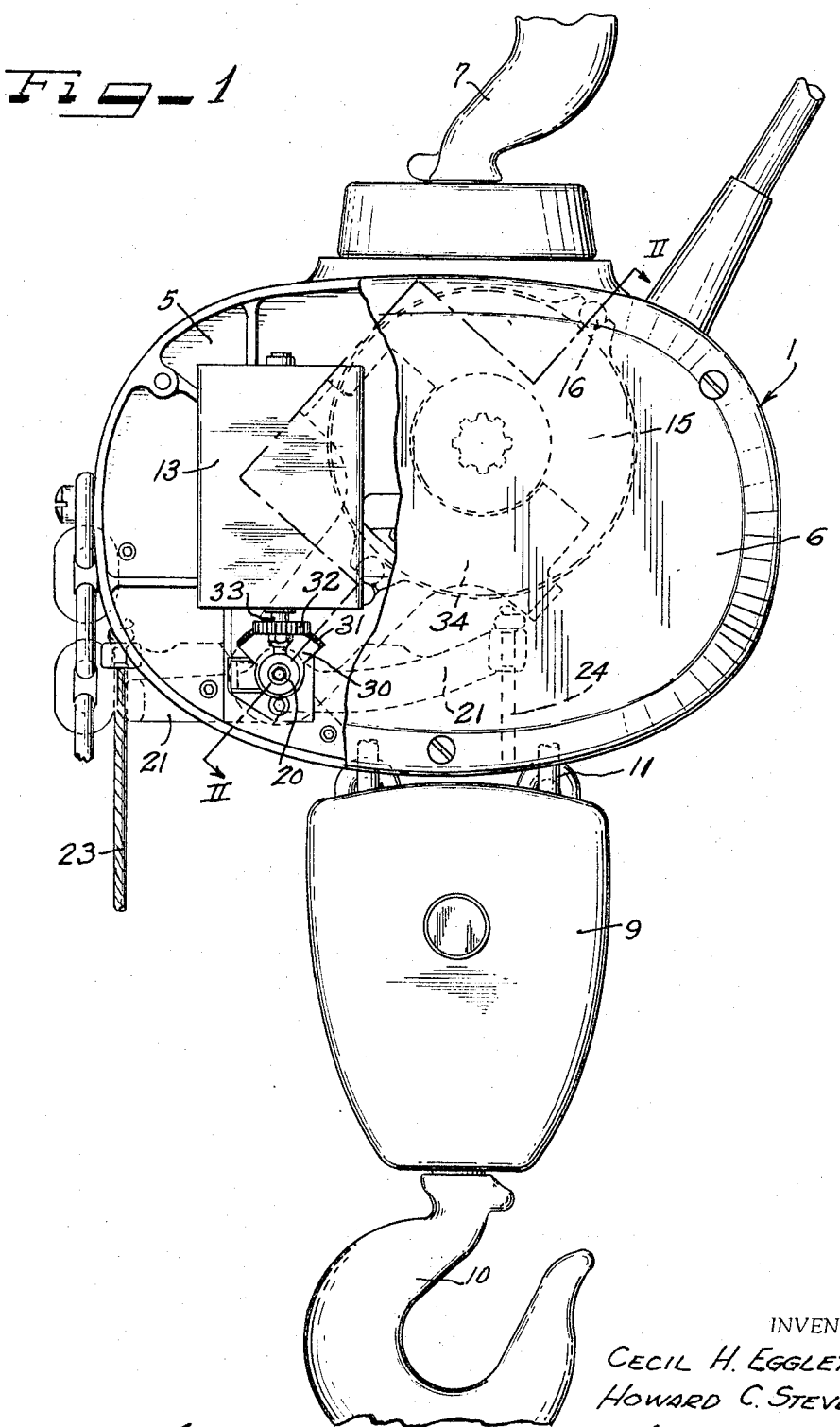
INVENTORS
CECIL H. EGGLETON JR.
HOWARD C. STEVENS JR.
BY ATTORNEYS

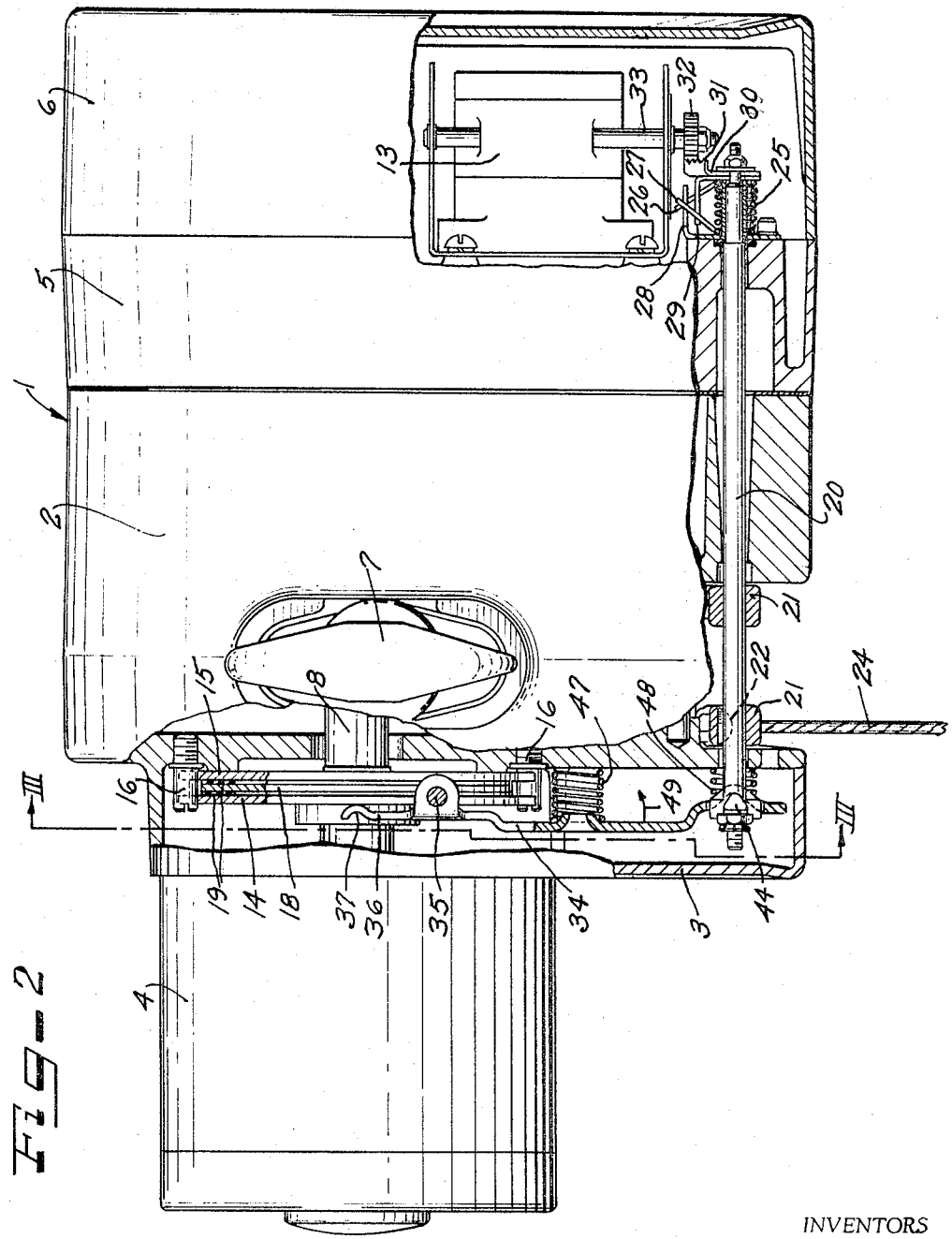

3,332,525
FRICTION BRAKE AND REVERSING CONTROL
FOR ELECTRIC HOISTS
Cecil H. Eggleton, Jr., Fruitport, and Howard C. Stevens,
Jr., Muskegon, Mich., assignors to Dresser Industries,
Inc., Dallas, Tex., a corporation of Delaware
Filed Aug. 25, 1965, Ser. No. 482,450
7 Claims. (Cl. 192—2)

This invention relates to improvements in a friction brake and reversing control for electric hoists, and more particularly to an assembly wherein a friction and reversing control may be simultaneously actuated in a simple manner to release the braking means and operate the hoist in either direction to selectively raise or lower a load, the invention being highly desirable for use in the control of electric hoists, but may have other uses and purposes as will be apparent to one skilled in the art.

In the past, various types of control means for hoists and the like have been utilized for releasing the brake means and selectively energizing the hoist motor in the forward or reverse direction. However, as heretofore used, such control means were such that the brake was objectionably difficult to adjust and thereafter to maintain the adjustment, and frequently the wear was unequally distributed requiring the use of heavier mechanism than is needed. In many cases formerly known control means for this general purpose were not as durable as desired, were susceptible to an objectionable amount of malfunction and did not actuate the motor switch and release the brake by way of the same movable element.

With the foregoing in mind, it is an important object of the instant invention to provide a control capable of releasing a friction brake and conjointly therewith actuating a reversing switch, the control being so arranged as to equally distribute wear on the brake whereby lighter parts may be utilized in both the control and brake structure.

It is also an important object of this invention to provide a control for releasing a friction brake and actuating a reversing switch, which control is so constructed and arranged as to facilitate adjustment of the brake and the ultimate maintaining proper brake adjustment.

Also an important feature of this invention is the provision of a control for a friction brake and switch, the control embodying a cam acting upon the brake arm, which cam is self-aligning so as to exert accurate and even pressure upon the brake arm regardless of the direction of movement of the cam.

Still another desideratum of this invention is the provision of a control for both a friction brake and switch, which control accurately performs both functions conjointly upon oscillation or partial revolution of a single shaft.

Another object of the invention is the provision of control mechanism for the friction brake and reversing switch of an electric hoist, which control mechanism is highly durable, simple to assemble, easily accessible and may be made of relatively light parts.

While some of the more salient features, characteristics and advantages of the instant invention have been above pointed out, others will become apparent from the following disclosures, taken in conjunction with the accompanying drawings, in which:

FIGURE 1 is a fragmentary end elevational view, with parts broken away to show parts therebehind, of an electric hoist provided with a control for the brake and reversing switch embodying principles of the instant invention;

FIGURE 2 is a fragmentary side elevational and part sectional view, the section being taken substantially as indicated by the line II—II of FIGURE 1, looking in the directions of the arrows;

FIGURE 3 is an enlarged fragmentary vertical sectional view taken substantially as indicated by the line III—III of FIGURE 2;

FIGURE 4 is an enlarged fragmentary perspective view showing the association of the cam both with the shaft and brake arm, the same structure being seen in the lower right hand portion of FIGURE 3 with the cam holding nut in place; and FIGURE 5 is an enlarged fragmentary sectional view taken substantially as indicated by the line V—V of FIGURE 3.

As shown on the drawings:

By way of example, and to better illustrate the functioning of the instant invention, the same is shown embodied in a portable electric hoist, generally indicated by numeral 1. Since the hoist 1 itself embodies many mechanisms known to those skilled in the art, it is only necessary herein to disclose and describe the structure of the instant invention in its association with those parts of the hoist structure to which connections are made.

In brief, the hoist comprises a frame 2 to one end of which is connected a cover 3 for part of the mechanism of the instant invention, and a housing 4 for an electric motor which operates the hoist mechanism. On the other end of the frame is a cover 5 in the form of a gear housing to which is an end cap or cover 6 enclosing the reversing switch of the hoist. In use, the hoist is suspended from an overhead main support by means of a hook 7 or equivalent suspension member.

A motor shaft 8 extends from the motor in the housing 4 into the interior of the frame 2 and is connected to drive hoist mechanism through the gears in the housing 5 to cause elevation or lowering of a lower block 9 carrying a load hook 10 by means of a chain 11 in a known manner.

The host is provided within the cover 6 with a reversing switch 13 of a character known to those skilled in the art, and which controls the motor to operate in reverse directions for selectively lowering or raising a load. Braking means are also provided adjacent the motor shaft 8 and embody a pair of spaced disks 14 and 15 which are freely slidable along the motor shaft but are prevented from rotating with the motor shaft by spaced pins 16–16 extending into notches 17—17 in the disks. Between these disks is another disk 18 keyed to the motor shaft to rotate therewith. On each side of the rotary disk 18 is a friction ring 19 which friction rings may be carried either by the rotary disk or one on each of the adjacent non-rotary disks. Squeezing of the disks toward each other in a manner to be later described prevents rotation of the motor shaft or reduces it to a desired extent, while release of pressure permits movement of the disk 14 along the motor shaft, permitting free rotation of the motor shaft and disk 18.

The instant invention includes a single control shaft 20, suitably journalled in a host frame and cover 5, with one end terminating inside the cover 3 and the other end terminating inside the cover 6 beneath the reversing switch 13. A substantially rectangular limit lever 21 has parts embracing the control shaft in an intermediate portion of the lever as seen in FIGURES 1 and 2, and the lever is keyed to the control shaft as indicated at 22 in FIGURE 2. By means of pull cords 23 and 24, FIGURE 1, connected to opposite ends of the limit lever, this lever may be actuated to oscillate or partially rotate the color shaft 20 in either direction, depending upon the direction of rotation desired of the host motor.

Control of the reversing switch 13 is effected by means of a helical torsion spring 25 around the end of the shaft within the cover 6. This spring has end portions 26 and 27 disposed on opposite sides of a pair of fingers 28 and 29 and extending in opposite directions above the spring. The finger 28 is fixed to the cover 5 while the finger 29 oscillates with the shaft 20. Also carried by the shaft to move therewith is a sector 30 having rack teeth 31 on the outer upper edge thereof in engagement with a pinion 32 on the shaft 33 of the reversing switch. With this arrangement, it will be seen that a pull on the cord 23 will cause rotation of the reversing switch shaft 3 counterclockwise, while a pull on the cord 24 will cause rotation of the reversing switch shaft clockwise to selectively energize the hoist motor in the desired direction. Immediately upon release of the respective pulled cord, the spring end portions 26 and 27 acting upon the fingers 28 and 29 will immediately rotate the control shaft 20 and accordingly the reversing switch shaft 33 to initial or neutral position with the hoist motor deenergized.

Now, with reference to FIGURES 2, 3, 4 and 5, it will be seen that with the instant invention the braking disks 14, 15 and 18 are maintained in compressed or braking position by means of a brake arm 34 pivoted on opposite sides thereof to studs 35—35 as best seen in FIGURE 3. The upper end of this arm is bifurcated to provide opposed pressure arms 36—36 on opposite sides of the motor shaft 8, each of which is bent or beaded transversely to provide pressure pads 37—37 which bear against the adjacent brake disk 14.

As best seen in FIGURES 4 and 5, the brake arm 34 is provided with a flared V-formation 38 on each side of the shaft 20 to provide upper and lower ramp faces 39 and 40 for engagement by a cam generally indicated by numeral 41. This cam has a cylindrical body portion 41a and a convex outer face 41b. The brake arm 34 is provided with an aperture 34a to loosely receive therethrough the cylindrical body part 41a of the cam, as seen in FIGURE 5, the aperture 34a being of such size that the brake arm is completely clear of the cam body during pivotal movement of the arm in either direction. This avoids any binding action that might otherwise occur and cause the braking means to operate incorrectly when the arm 34 is pivoted.

The cam 41 is oscillated in either direction by the control shaft 20 to pivot the brake arm 34 and release the braking means. To this end, the shaft 20 is provided with an outer end portion 42 that is substantially rectangular in shape and threaded on opposite sides thereof. The cam is provided with a slot 43 therein slightly longer than the shaft end 42 so that the cam may rock relatively to the shaft which renders the cam self-aligning with respect to the aforesaid V-formations 38—38 in the lower portion of the brake arm. On each side thereof the cam is provided with a projecting substantially V-shaped rider head 44 for engaging the brake arm along the ramp portions 39 and 40 of the V-formations 38—38. The apices of the rider heads 44—44 are rounded as clearly seen in FIGURE 5 to insure smooth action. The cam is maintained on the shaft end 42 by means of a polygonal nut 45 threadedly connected with the shaft and against which the curved convex end portion 41b of the cam abuts. Opposed flat faces of the nut 45 enter between upper and lower spaced lugs 46—46 on the cam so that the nut is prevented from rotating relatively to the shaft and becoming loosened.

As seen, especially in FIGURES 2 and 5, the shaft 20 and of course the cam 41 are in neutral position. The braking discs are held compressed in braking position by a spring 47, FIGURE 2, interposed between the hoist frame 2 and the brake arm 34, below the brake arm pivot 35. This spring 47 pivots the brake arm clockwise as viewed in FIGURE 2 and pads 37—37 compress the braking disks. Another spring 48 around the control shaft 20 between the hoist frame and the cam 41 holds the cam constantly with its convex surface 41b against the nut 45, and insures the maintenance of sufficient clearance, indicated at 49 in FIGURE 5, between the apices of the cam rider heads 44—44 and the V-formations in the brake arm, whereby the brake arm will always pivot sufficiently to hold the braking disks securely locked when the shaft 20 is in neutral position. The convex face 41b of the cam eliminates the danger of any high edge load on one or another edge of the nut 45.

When the control shaft is oscillated in either direction by a pull on the respective pull cord 23 or 24, one rider end 44 of the cam will ride an upper ramp face 39 of the brake arm while the opposite end 44 will ride a lower ramp face 40 on the brake arm. Thus the lower end of the brake arm will be forced to the right as seen in FIGURES 2 and 5 against the action of the spring 47 and pivot the brake arm as indicated by the arrow 49 in FIGURE 2 so that the upper end of the brake arm moves away from the adjacent braking disk. Upon release of the pull cord the control shaft is immediately restored to neutral position and the braking disks are again compressed in braking position.

It will be especially noted that the slightly oversized slot 43 in the cam and the rocking movement of the cam relatively to the shaft permitted thereby insures even and equalized pressure of the cam on the lower end of the brake arm at all times, and consequently the pressure of the pads 37—37 at the upper end of the brake arm is even and equalized against the adjacent braking disk 24. This arrangement permits easy and quick adjustment of the braking means and the ultimate maintaining of the desired adjustment with equal ease. Further, the wear on the respective parts is evenly and equally distributed permitting the use of lighter parts than would be the case if the wear was unequally distributed, requiring the use of sturdier parts.

It will be further noted that the simple oscillation of the single control shaft 20 results in immediate braking release and concurrent energization of the motor in the desired direction by way of actuating the reverse switch 13, and immediately upon release of the respective pull cord, the parts are at once restored to neutral position with the braking means effective. Further, the parts are simple in construction, extremely easy to assemble, long lived, with a minimum likelihood of becoming out of adjustment.

It will be understood that modifications and variations may be effected without departing from the scope of the novel concepts of the present invention.

We claim as our invention:
1. In a hoist,
   a frame,
   a motor shaft in said frame,
   braking means operable on said motor shaft and consisting essentially of alternating rotary and nonrotary discs coaxially mounted thereon,
   a reversing switch controlling the motor drive of said motor shaft,
   a single control shaft,
   means selectively operable manually to oscillate said control shaft in either direction,
   means on said control shaft effective during oscillation thereof to actuate said reversing switch,
   an arm pivotally mounted intermediate its end with a first end receiving said control shaft therethrough and the second end being normally urged into an engagement against a face of one of said discs to place them into braking position, and
   camming means carried by said control shaft opposite the first end of said arm and effective when said control shaft is oscillated to cam said arm to release said braking means.

2. In a hoist according to claim 1 in which said first end of said arm is formed with a gradual offset comprising a cam follower surface and said cam means comprises an elongated cam member centrally secured to said control shaft and supported in said offset normally disengaged from its follower surface.

3. In a hoist according to claim 2 in which said cam member is secured to said control shaft with a predetermined freedom of transverse movement relative to the axis thereof whereby to permit self-alignment of said cam member with respect to the follower surface of said arm.

4. In a hoist,
a frame,
a motor shaft in said frame,
braking means operable in said motor shaft,
an intermediately pivoted brake arm,
resilient means biasing said arm to cause one end of said arm to normally hold said braking means in braking position,
a cam track on the opposite end of said arm,
a control shaft,
means to oscillate said control shaft, and
a cam carried by said control shaft to ride said cam track and pivot said arm to release said braking means upon movement of the shaft,
said cam being rockable with respect to said control shaft to be self-aligning.

5. In a hoist,
a frame,
a motor shaft in said frame,
braking means operable on said motor shaft,
an intermediately pivoted brake arm,
resilient means biasing said arm to cause one end of said arm to normally hold said braking means in braking position,
a cam track on the opposite end of said arm,
a control shaft,
means to oscillate said control shaft, and
a cam riding on said cam track and floatingly mounted on said control shaft for turning movement therewith, to depress said brake arm and release said braking means.

6. In a hoist,
a frame,
a motor shaft in said frame,
braking means operable on said motor shaft,
an intermediately pivoted brake arm,
resilient means biasing said arm to cause one end of said arm to normally hold said braking means in braking position,
a control shaft having means to oscillate said control shaft about its axis,
a cam track on said brake arm and extending about said control shaft and having
diametrically aligned V-formations on each side of said shaft,
a cam mounted on said control shaft for engagement with said cam track and having free radial and rockable movement with respect to said shaft, to accommodate self-alignment of said cam with respect to the V-formations of said cam track, as said cam is turned to release said braking means.

7. In a hoist,
a frame,
a motor shaft in said frame,
braking means operable on said motor shaft,
an intermediately pivoted brake arm,
resilient means biasing said arm to cause one end of said arm to normally hold said braking means in braking position,
a cam track on the opposite end of said arm,
a control shaft,
means to oscillate said control shaft,
said control shaft having opposite flattened parallel sides forming a cam mounting,
a cam floatingly mounted on said cam mounting,
said cam having a slot therein slidably engaging said parallel sides,
said slot being longer than the diameter of said shaft, to accommodate slidable rocking movement of said cam with respect to said shaft and self-alignment of said cam with respect to said cam track,
and means biasing said cam track into engagement with said cam,
whereby turning movement of said control shaft and cam will effect pivotal movement of said arm to release said braking means.

References Cited
UNITED STATES PATENTS

| | | | |
|---|---|---|---|
| 2,060,175 | 11/1936 | Carleton | 192—93 X |
| 2,233,798 | 3/1941 | Robins | 192—2 |
| 2,634,000 | 4/1953 | Ulrich | 254—168 X |

MARK NEWMAN, *Primary Examiner.*

ARTHUR T. McKEON, *Examiner.*